United States Patent [19]

Strahl

[11] 4,191,099
[45] Mar. 4, 1980

[54] SEALING ARRANGEMENT FOR CHIMNEYS WITH AN ANNULAR PRESSURIZED SPACE

[75] Inventor: Victor H. Strahl, Kansas City, Mo.

[73] Assignee: Pullman Incorporated, Chicago, Ill.

[21] Appl. No.: 889,456

[22] Filed: Mar. 23, 1978

[51] Int. Cl.² ............................................ F23L 17/02
[52] U.S. Cl. ...................................... 98/60; 110/184; 126/307 R
[58] Field of Search ........................................ 98/58-60; 126/307 R, 312; 52/219, 222; 110/184; 114/187; 104/52

[56] References Cited

U.S. PATENT DOCUMENTS

| | | | |
|---|---|---|---|
| 1,759,830 | 5/1930 | Blanchard | 98/60 |
| 3,368,506 | 2/1968 | Lawrence | 110/184 |
| 3,537,411 | 11/1970 | Roy | 98/60 |
| 3,669,042 | 6/1972 | Lawrence | 110/184 |
| 3,727,566 | 4/1973 | Roy | 110/184 |
| 3,780,639 | 12/1973 | Wood | 110/184 |
| 4,111,107 | 9/1978 | Engleke | 98/60 |

Primary Examiner—Henry C. Yuen
Attorney, Agent, or Firm—Richard J. Myers

[57] ABSTRACT

A chimney having concentric tubular walls defining an annular pressurized space includes a sealing arrangement having a flexible boot with one edge connected to one of the walls. The top hood or cover supported on the inner wall of the chimney includes a lower annular surface which extends over the outer wall. Spring biased support members supported on the outer walls are connected to an annular seal ring to which a second flexible edge of the boot is connected and supports the same in sealing relation against the lower annular surface of the hood to seal the annular space and accomodate relative movement of the walls resulting from natural elements.

10 Claims, 4 Drawing Figures

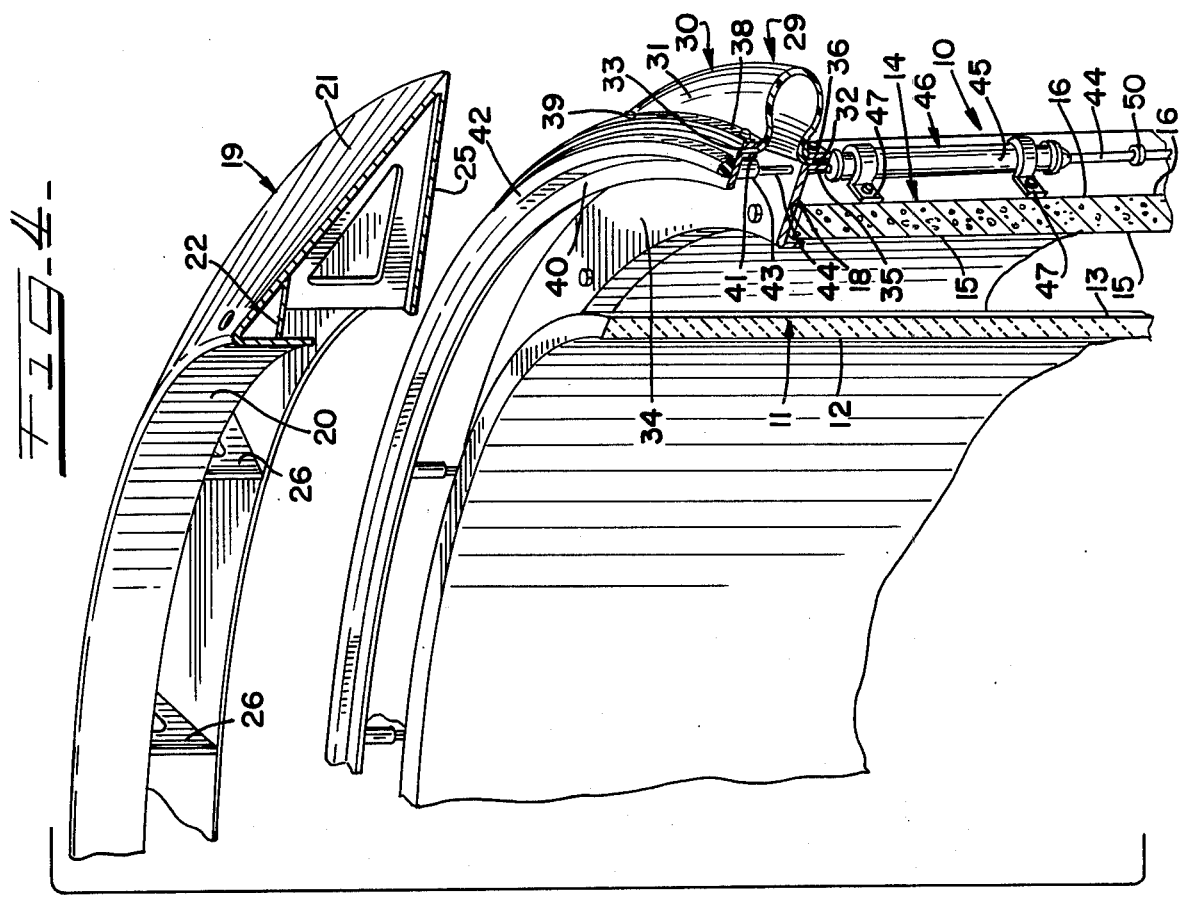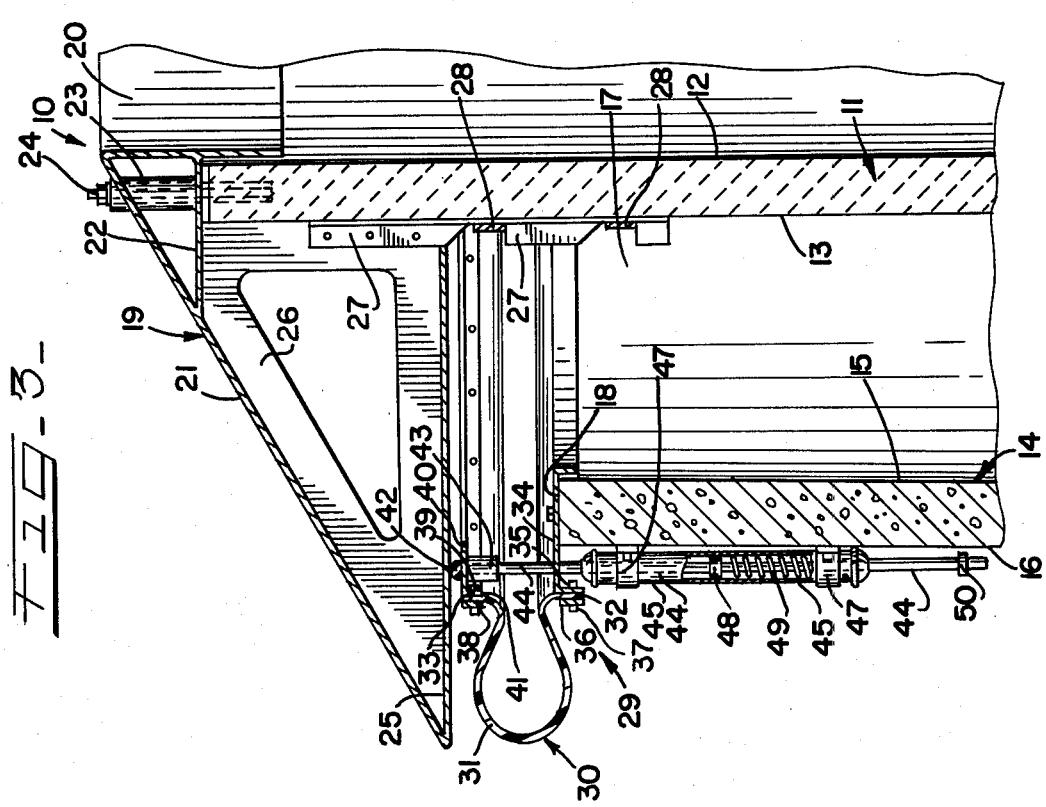

SEALING ARRANGEMENT FOR CHIMNEYS WITH AN ANNULAR PRESSURIZED SPACE

BACKGROUND OF THE INVENTION

1. Field of the Invention

The present invention relates to industrial chimneys, particularly those having concentric tubular walls or columns having an annular air space therebetween.

2. Description of the Prior Art

Prior attempts have been made to seal the annular air space between inner and outer chimney cylinders and have taken many forms primarily involving rigid members and in some instances, flexible seals have been utilized. However, some of the prior arrangements have utilized a seal such as that disclosed herein.

SUMMARY OF THE INVENTION

Large industrial chimneys having an outer column which shields an inner independent brick or similar liner often require that the annular space between the column and liner be pressurized to prevent the intrusion of flue gases into the annular area which normally must be kept accessible for service personnel. To achieve this objective, it is necessary to close off the air space between column and liner at the top of the chimney. However, any sealing device installed at this location must have the capability of accommodating the horizontal and vertical movements of the column and liner due to wind, temperature, etc., which, in the case of tall chimneys, can be several feet. The circular shape of the chimney adds to the problem as do considerations of cost, operational reliability in a deleterious environment, reduction of ground hazard in the event of failure, and minimal maintenance and ease of repair.

Solutions to the problem fall into two categories, one of which utilizes rigid materials which are hinged or which form sliding contacts. These are intended to accommodate the movements of the chimney resulting from the natural elements. The other solution employs a flexible material to form a continuous seal or boot, one side being attached to a rain hood or cover which in turn is mounted on top of the liner while the other side is fastened to the outer column at its upper terminal edge whereupon then sufficient material is draped between the supports to allow for the anticipated movements.

The latter construction has the definite advantage over the former except that where large horizontal movements are encountered, which is usually the case in tall chimneys, the boot, which has its outer peripheral edges both rigidly connected, may fail. This results because of the circular shape of the chimney and the corresponding semitoroidal form of the boot. Any horizontal movement between the column and liner results in varying radial and tangential deformations of the flexible boot depending on the point along the circumference of the chimney being considered. Such tangential or shifting deformations are greatest at those points on the periphery of the boot which are perpendicular to the direction of motion. The industrial boot material customarily utilized, though flexible or resilient enough under ordinary conditions, lacks the capability to withstand the magnitude of shearing deformations, characteristically encountered in taller chimneys such as those in which the present invention is adapted to be used.

The invention provides for a flexible boot construction which essentially obviates the aforementioned difficulties. I.e., a flexible boot is utilized but direct attachement of the upper flange of the boot to the liner hood or cover is eliminated. More particularly, the lower flange or circumferential edge of the boot is directly attached to the upper terminal end of the outer tubular column or wall and the upper circumferential flange of the boot is attached to a circular plate or rail supported by a series of spring posts circumferentially positioned or mounted along the periphery of the upper terminal end of the outer column and sealingly engaging an upper cover or roof radially extending from the chimney liner. The cover or roof is provided with a smooth lower horizontal soffit plate against which the circular rail carrying the upper end of the boot is forced by the action of the spring posts. The circular plate or rail includes a circumferential seal or ring which engages the underneath side of the soffit or roof structure to effectively seal the pressurized annular space. Thus, the novel sealing arrangement of the present invention is adapted to slide relative to the underneath surface of the soffit plate to effectively maintain a seal despite horizontal and vertical relative movement between the outer column and the liner while essentially eliminating tearing or fracturing fatigue stresses in the sealing boot.

BRIEF DESCRIPTION OF THE DRAWINGS

FIG. 3 is an enlarged cross-sectional view of the upper end of an industrial chimney, similar to FIG. 1; and FIG. 4 is an exploded perspective view showing the upper portion of an industrial chimney with the improved sealing arrangement.

DESCRIPTION OF THE PREFERRED EMBODIMENT

Figure 1:
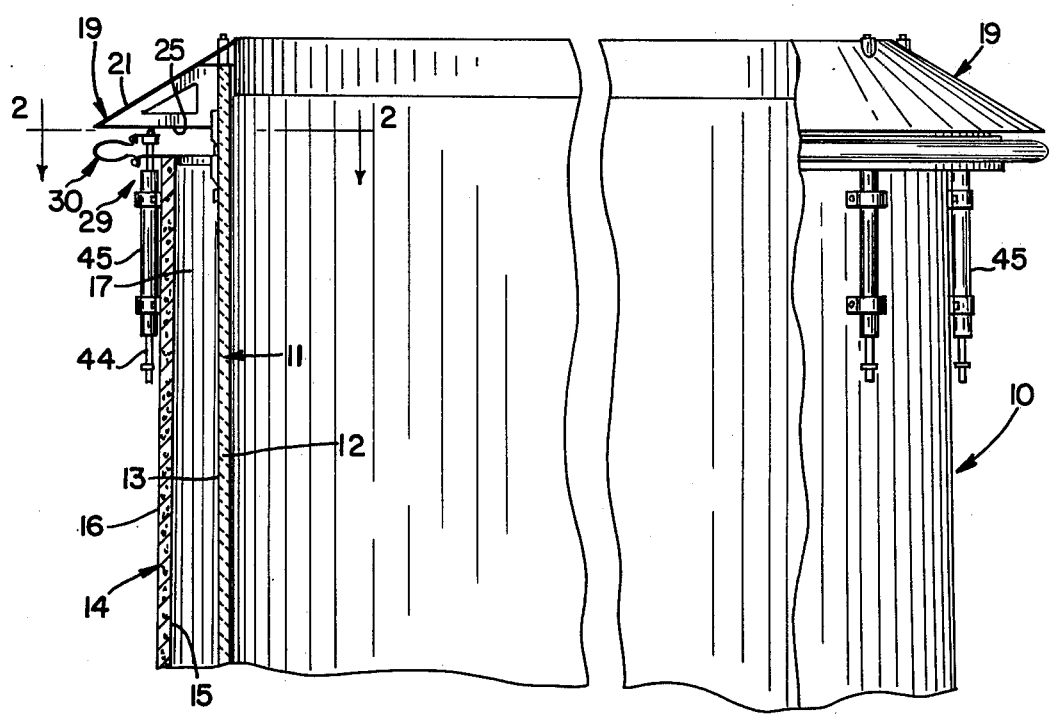
FIG. 1 is a side elevational view partially in section showing the upper end of an industrial chimney.
Figure 2:
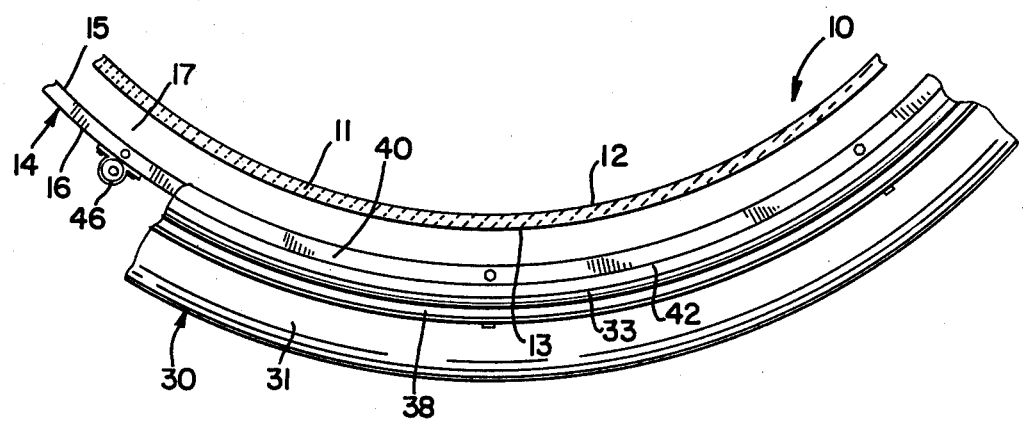
FIG. 2 is a cross-sectional view taken substantially along the line 2—2 of FIG. 1.

The drawings disclose an industrial chimney 10 of the dual wall type which includes an inner liner 11 of brick tubular construction and having an inner wall 12 and an outer wall 13. An outer tubular column 14 concentric with the tubular brick column 11 includes an inner wall 15 and an outer wall 16, the latter generally being of a concrete construction. The columns 11 and 14 are radially spaced to provide an annular pressurized air space or chamber 17. In large industrial chimneys to which the present invention pertains, this annular space between the column walls is pressurized to prevent the intrusion of flue gases into the annular area which must be kept accessible for service personnel. The outer tubular column 14 includes an upper terminal edge 18 which is vertically spaced from a hood or roof cover structure designated at 19. The structure 19 includes a central metal flue cylinder 20 which is integral with a top roof or hood plate 21 of relatively conical shape sloping downwardly as best indicated in FIG. 3. The hood plate is connected to a web 22 in turn connected to and intermediate the ends of the metal flue cylinder 20. The web 22 and the upper ends of the hood 21 have connected thereto a plurality of vertically extending sleeves 23 in circumferentially spaced relation. Anchor bolts 24 securely connect the roof cover 19 to the upper terminal edges of the inner liner 11 as best indicated in FIGS. 3 and 4.

A roof cover structure 19 also includes a lower flat annular soffit plate 25 suitably integrally connected with the roof cover structure 19 by means of a plurality of circumferentially spaced ribs 26. The hood structure 19 is rigidly secured to the inner liner 11 by means of a plurality of circumferentially spaced connector angles 2 which are secured around the outer wall 13 of the inner liner 11 by means of connector bands 28.

Referring particularly to FIGS. 3 and 4 a sealing arrangement for the annular space 17 is indicated at 29 and includes a flexible boot generally designated at 30. The flexible boot consists of an outwardly extending bulbous portion 31, a lower outer peripheral or circumferential edge or flange 32 and an upper peripheral or circumferential edge or flange 33. The material of the boot is preferably of a kind that is resistant to heat and acid, these conditions being normal in the operation of an industrial chimney.

The outer column 14 at its upper terminal edge 18 is provided with an annular cap 34 of channel construction. The cap includes an outer flange 35 to which the circumferential flange 32 or edge of the boot is securely connected by means of a connector ring 36 and bolt and nut fasteners 37. The connector ring 38 and similar nut and bolt fasteners 39 connect the peripheral or circumferential flange or edge 33 to a sealing ring 40 as best known in FIGS. 3 and 4. The sealing ring 40 also includes the downwardly projecting outer flange 41 to which the latter mentioned parts are connected. An annular or strip resilient or rubber type seal 42 is suitably supported on top of the sealing ring 40 and as best shown in FIG. 3 is in engagement with the lower flat annular soffit plate 25. The sealing arrangement as best shown in FIGS. 3 and 4, also includes a plurality of tubular sleeves 43 spaced around the circumference of the sealing ring 40 and projecting downwardly with respect thereto. The sealing ring 40 is moved or biased vertically by a plurality of spring devices 46 which are spaced around the outer column 14 in circumferentially spaced relation. Each spring device 46 includes a piston rod 44 the upper end of which in connected within each tubular sleeve 43. The piston rods extend downwardly through piston housing 45. Each of the piston housings 45 is suitably connected by means of brackets 47 to the outer wall 16 of the outer tubular column 14. The piston 48 is connected to each of the piston rods 44 intermediate its ends and is slidably disposed in each of the piston housings 45. Suitable springs 49 held captive within the piston housings 45 against the pistons 48 urge the piston rods 44 to move upwardly thus maintaining the annular seal 42 in engagement with the lower wall or soffit 25. Stops 50 at the lower end of the piston rods 44 limit the upward movement of the sealing ring 40.

OPERATION

As previously indicated substantial vertical expansion and contraction and side or horizontal movement of industrial chimneys will occur due to the natural elements. The present arrangement is particularly effective in sealing the pressurized annular space 17 between the outer column and liner of the chimney by means of spring devices which continually bias the sealing ring 42 into sliding engagement with the lower surface or soffit plate 25 such that loading on the boot due to relative movement of the parts does not generate shearing stresses leading to tearing or fatigue fracture of the boot. Thus the sealing arrangement devised and disclosed in the present invention incorporates the advantages of a flexible boot design into an air containment system which overcomes the difficulties experienced with those constructions heretofore known yet prevents the development of extreme tensile and shearing boot deformations which experience has shown occurs in designs wherein the boot flanges are firmly or fixedly connected to the respective tubular members or columns. Moreover, the industrial boot material available on the market, though flexible enough under ordinary conditions, lacks the capability to withstand the shearing deformations which are encountered in taller chimneys. In the present arrangement extreme deformations of the boot are essentially obviated by the biased sliding seal between the upper flange of the boot and the cover or hood structure. This means of course that the flexible boot is subjected for the most part only to vertical movement. Horizontal displacements of the outer column with respect to the liner are taken care of and accommodated by sliding contact between the sealing strip mounted on the rail and the hood soffit.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a chimney having an outer tubular shell the improvement comprising:
    an inner tubular liner spaced and in axial alignment with said tubular shell to provide an annular space therebetween,
    an upper hood cover member supported on said inner tubular liner above said annular space,
    a flexible boot-like member having first and second annular circumferential edges, said first edge connected to said outer tubular shell,
    seal means for sealingly engaging said second edge means of said boot-like member, and
    biasing means for supporting said seal means for sealing and sliding engagement of the seal means against said hood cover to substantially enclose said annular space.

2. The invention in accordance with claim 1, and: said hood cover member having a lower generally flat annular surface, said seal means including an annular seal strip in engagement with said annular surface.

3. The invention in accordance with claim 1, and: said biasing means including spring means uring said seal means into said sealing engagement with said hood cover.

4. The invention in accordance with claim 1, and: said hood cover having a generally flat, annular, lower surface disposed above said annular space, and
    said seal means including an annular seal strip in sealing engagement with said annular, lower surface.

5. The invention in accordance with claim 1, and said seal means including an annular seal strip means providing said sealing and sliding engagement with said hood cover, and said biasing means including a plurality with said hood cover, and said biasing means including a plurality of spring-loaded members supported on said chimney in circumferentially spaced relation urging said annular seal strip means into said engagement.

6. The invention in accordance with claim 5, and:
said seal means including seal ring means supporting said seal strip means,
said spring-loaded members including tubular housings supported on said outer tubular shell,
piston members slidingly supported in said housings and engaging said seal ring means, and
spring means urging said piston members and said seal ring means to provide said sealing and sliding engagement between said seal strip means and said hood cover.

7. The invention in accordance with claim 6, and:
said outer tubular shell having an upper terminal end vertically spaced below said hood cover,
annular cap means secured to said terminal end, and
means on said cap connecting said first, annular, circumferential edge of the boot-like member to said outer tubular shell.

8. The invention in accordance with claim 6, and:
said cap having means projecting radially outwardly of said terminal end of said outer shell and including a plurality of openings,
said piston members extending through said openings in relative sliding relation.

9. The invention in accordance with claim 1, and:
said boot-like member comprising a heat and acid resisting material.

10. The invention in accordance with claim 1, and:
said hood cover having means projecting outwardly of and forming a roof over said annular space,
said boot-like member having a body of bulbous shape in cross-section integral with both the first and second annular circumferential edges and disposed between said outer shell and said hood cover and projecting circumferentially outwardly of said shell.

* * * * *